United States Patent Office 3,336,101
Patented Aug. 15, 1967

3,336,101
RECOVERY OF CHEMICALS FROM BLACK LIQUOR
Gustaf Rune Hellerqvist, Sundsvall, Sweden, assignor to Billeruds Aktiebolag, Säffle, Sweden, and Svenska Cellulosa Aktiebolaget, Sundsvall, Sweden, both companies of Sweden
No Drawing. Filed Oct. 31, 1963, Ser. No. 320,574
Claims priority, application Sweden, Nov. 1, 1962, 11,746/62
5 Claims. (Cl. 23—48)

In the manufacture of cellulose by the sulphate process the plant substance is digested in a liquor containing mainly hydroxide and sulphide of sodium. The sulphidity, that is the ratio of the molar content of $Na_2S$ to that of active alkali (sodium sulphide and hydroxide) is usually 25–35 percent. After the digestion of the spent liquor, the black liquor contains the main portion of the cooking chemicals, the lignins dissolved, and other organic substances. The black liquor is evaporated for the recovery of chemicals, part of the sulphur being released as $H_2S$. The evaporated liquor is combusted in a soda recovery furnace. The main portion of the sodium content is converted into soda, whereas the sulphur content partly leaves together with the combustion gas, partly remains in the molten residue. The gas leaving the soda recovery furnace is passed through a scrubber for the utilization of heat and for the recovery of sodium salts accompanying the gas. The scrubber water dissolves a great portion of the sulphur dioxide produced in the combustion of the black liquor, especially if the gas is washed with an alkaline liquid.

For sanitary reasons it has for a long time been desired to reduce the discharge of malodorous materials in the vicinity of the sulphate mills. Therefore, the hydrogen sulphide produced in the evaporation is recovered and returned to the process. The recovery and return of sulphur from the evaporation and from the soda recovery furnace disturbs the sulphur balance. Formerly, the losses of sulphur and sodium have been balanced by an addition of sodium sulphate so as to cover the sodium losses, which occur mainly in the separation of the cellulose from the spent liquor. If the sulphur is prevented from leaving the process the sulphidity will increase, which cannot be tolerated. It is possible to restore the sulphur balance by compensating part of the sodium loss by an addition of NaOH. However, NaOH is usually more expensive than sodium sulphate, rendering such a control of the sulphidity comparatively expensive.

This invention relates to a method of controlling the sulphidity while allowing the use of sodium sulphate for covering the sodium loss. Consequently, the invention can be said to be a method for removing sulphur from the process in a controlled way. The method of the invention is characterized in pyrolyzing part of the liquor, preferably not more than 50% of it, in a reducing atmosphere to form a gas which contains hydrogen sulphide and a solid residue which contains soda and is substantially free of sulphur, combusting the residual portion of the black liquor in a soda recovery furnace to produce a sulphide-containing soda, and returning the substantially sulphur-free solid residue and the sulphide-containing soda to the process together with fresh sodium sulphate for the preparation of fresh cooking liquor.

In the pyrolysis nearly the entire sulphur content of the spent liquor is released as $H_2S$, and the organic substance is partly converted into carbon and partly into CO and $CO_2$. The solid residue is separated from the gas by means of cyclone separators, for instance. This solid residue, being nearly free of sulphur, can be directly combusted in the soda recovery furnace. Alternatively, the solid residue can be leached with water to produce a soda solution, free of sulphur, and a residue of pure carbon. The soda solution can be directly returned to the process, and the residue of carbon can be combusted in the soda recovery furnace or in another boiler. The gas from the pyrolysis is combusted in a separate conventional boiler for the utilization of its heat of combustion. In this combustion the $H_2S$ is converted into $SO_2$. The combustion gas, which contains $SO_2$, can usually be discharged after having been cooled, due to the fact that $SO_2$ is not as malodorous as $H_2S$, and due to the fact that the combustion gas is nearly free of sodium salts.

For the manufacture of fresh sulphate liquor ("white liquor") sodium sulphate shall, according to the invention, be supplied to the process to cover the inevitable sodium loss. This sodium sulphate can, in a known way, be added to the portion of the black liquor supplied to the soda recovery furnace. Alternatively, said sodium sulphate can be added to the portion of the black liquor supplied to the pyrolysis process. In the latter case the sodium sulphate is converted into almost pure sodium carbonate during the pyrolysis. The residues from the pyrolysis and from the soda recovery furnace are causticized in a known way, separately or in combination, by being dissolved in water followed by an addition of lime, the carbonate being thus converted into hydroxide.

By this invention a complete control of the sulphidity is obtained. Also another advantage is obtained, viz. an increased capacity. The soda recovery furnace is often the narrowest portion of a mill. The invention makes it possible to combust the pure gas and the leached carbon powder, if any, in a separate boiler, and such boilers are usually available in most sulphate mills. Consequently, the invention makes it possible to increase the capacity of the mill at a low cost. If too great a part of the black liquor is pyrolyzed it will be difficult to maintain a sufficiently high sulphidity. Therefore, it is preferred to pyrolyze not more than half the total quantity of black liquor.

The hydrogen sulphide in the pyrolysis gas can be absorbed in a liquid, for instance a solution of ethanolamine, from which it can be evaporated in a more concentrated form. The gas, thus concentrated, can be converted into free sulphur or into other chemicals. For instance, sodium polysulphide may be produced, and this polysulphide can be used for increasing the yield of cellulose in the sulphate process. The polysulphide can be produced from sodium sulphide and free sulphur, the sodium sulphide having been produced from the hydrogen sulphide, the free sulphur having been produced by a combustion of the hydrogen sulphide according to the Claus process.

The black liquor shall be pyrolyzed at the following preferred conditions, so as to produce a combustible gas and a soda which is free of sulphide. The pyrolysis shall take place in a reducing atmosphere. Such an atmosphere is produced by spraying the liquor into a furnace, and supplying a hot combustion gas into the furnace, for instance a gas produced by the combustion of oil. Part of the heat required for maintaining the desired temperature of 600–840° C., preferably below the melting point of sodium carbonate, is produced by an external combustion of oil, but the main portion of said heat is produced by the internal combustion of the liquor. The desired temperature is maintained by controlling the content of oxygen in the hot combustion gas. This content of oxygen must be lower than the content required for a complete combustion of the black liquor, and preferably lower than half said last mentioned content. The black liquor shall preferably be finely divided so that the major portion of the droplets have a size below 200 microns.

The black liquor shall preferably be concentrated by evaporation to a content of more than 45 percent of solids, preferably to the highest possible content of solids. The atomization of the black liquor is more difficult at a high content of solids, as a high content of solids increases the viscosity of the liquor. The viscosity shall preferably be below 50 centistokes, measured at 90° C., usually corresponding to a solids content of 58 percent by weight. It is important that the hot combustion gas is blown towards the spray of liquor, so as to mix the hot gas with the droplets as rapidly as possible. After having been mixed with the hot gas the droplets are pyrolyzed within a fraction of a second. For practical reasons, however, it is often preferred to use an average dwelling time of 1–5 seconds for the droplets in the furnace. After the pyrolysis the solid residue shall be separated from the gas as rapidly as possible, for instance, by means of cyclone separators, or it shall be cooled rapidly to below 500° C.

What is claimed is:

1. A method to recover chemicals from black liquor, characterized in pyrolyzing a substantial, but not major part of the liquor in a reducing atmosphere to form a pyrolysis gas which contains hydrogen sulphide and a solid pyrolysis residue which contains soda and is substantially free of sulphur, combusting the residual portion of the same black liquor in a soda recovery furnace to produce a sulphide-containing soda, and returning the substantially sulphur-free solid pyrolysis residue and the sulphide-containing soda to the process together with fresh sodium sulphate for the preparation of fresh cooking liquor.

2. A method as claimed in claim 1, characterized in that said pyrolysis residue, which in addition to soda contains free carbon, is supplied to the soda recovery furnace for the combustion of the free carbon content thereof.

3. A method as claimed in claim 1, characterized in that said pyrolysis residue, which in addition to soda contains free carbon, is leached in water, and that the soda solution thus produced, which is substantially free of sulphur, is used for the production of fresh cooking liquor.

4. A method as claimed in claim 1, characterized in converting the hydrogen sulphide in the pyrolysis gas into sodium sulphide and into free sulphur, producing sodium polysulphide from said sodium sulphide and said free sulphur, and utilizing said sodium polysulphide in the preparation of fresh cooking liquid.

5. A method as claimed in claim 1, characterized in supplying the sodium sulphate to the portion of the black liquor which is pyrolyzed.

References Cited

UNITED STATES PATENTS

| Re. 18,958 | 9/1933 | Bottoms | 23—2.3 |
| 1,519,508 | 12/1924 | Richter | 23—48 X |
| 2,399,142 | 4/1946 | Reed | 23—181 X |
| 2,796,325 | 6/1957 | Bertozzi | 23—138 X |
| 3,073,672 | 1/1963 | Cederquist | 23—48 |
| 3,083,077 | 3/1963 | Bjorkman et al. | 23—48 |
| 3,236,589 | 2/1966 | Reinhall et al. | 23—48 |

OSCAR R. VERTIZ, *Primary Examiner.*

G. T. OZAKI, *Assistant Examiner.*